(12) United States Patent
Meijer et al.

(10) Patent No.: US 7,730,448 B2
(45) Date of Patent: Jun. 1, 2010

(54) LAYERED TYPE SYSTEMS

(75) Inventors: Henricus Johannes Maria Meijer, Mercer Island, WA (US); David N. Schach, Redmond, WA (US); Avner Y. Aharoni, Seattle, WA (US); Peter F. Drayton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1299 days.

(21) Appl. No.: 11/201,507

(22) Filed: Aug. 11, 2005

(65) Prior Publication Data

US 2007/0038978 A1 Feb. 15, 2007

(51) Int. Cl.
*G06F 9/44* (2006.01)
*G06F 9/45* (2006.01)

(52) U.S. Cl. .................. 717/106; 717/107; 717/108; 717/109; 717/140; 717/144; 717/143

(58) Field of Classification Search .................. 717/106, 717/107, 108, 109, 140, 144, 143
See application file for complete search history.

(56) References Cited

U.S. PATENT DOCUMENTS

| | | | | |
|---|---|---|---|---|
| 5,696,974 A | * | 12/1997 | Agrawal et al. | 717/152 |
| 5,748,961 A | * | 5/1998 | Hanna et al. | 717/145 |
| 6,018,628 A | * | 1/2000 | Stoutamire | 717/147 |
| 6,237,135 B1 | * | 5/2001 | Timbol | 717/118 |
| 6,560,774 B1 | * | 5/2003 | Gordon et al. | 717/146 |
| 7,051,322 B2 | * | 5/2006 | Rioux | 717/143 |
| 7,389,498 B2 | * | 6/2008 | Meijer et al. | 717/141 |
| 2006/0130038 A1 | * | 6/2006 | Claussen et al. | 717/168 |

OTHER PUBLICATIONS

Wright, et al. "A Practical Soft Type System for Scheme", 1994, ACM, p. 250-262.*
Panizzi, et al. "On the Return Types of Virtual Functions", 1999, ACM, p. 37-42.*

* cited by examiner

*Primary Examiner*—Wei Y Zhen
*Assistant Examiner*—Qamrun Nahar
(74) *Attorney, Agent, or Firm*—Workman Nydegger

(57) ABSTRACT

The subject disclosure pertains to layering of a plurality of type systems. A development environment and language compilers can support multiple data models and their type systems in the same program. Elements of a program such as expressions can then be associated with several types from the multiple type systems. Compilers can employ the information provided by additional type systems to improve static type checking. Furthermore, the information can be bubbled up to a user in a plurality of forms including but not limited to intelligent assistance, auto-completion, tool tips, error information, and return types to enhance the program development experience.

20 Claims, 15 Drawing Sheets

|  | REGULAR EXPRESSIONS | XML | RELATIONAL |
|---|---|---|---|
| LAYERED: | [A-Z]* \| [0-9}+ | xsd:Address | Customers Table |
| OBJECT: | X As String | X As XElement | X As Dataset |

Fig. 3

LAYERED TYPE SYSTEMS

FIELD OF THE INVENTION

The present invention relates generally to a system for software program development and, more particularly, to a system for layering for multiple type systems.

BACKGROUND

Computer programmers create computer programs by editing source code files and passing these files to a compiler program to create computer instructions executable by a computer or processor-based device. In the early days, this task was most commonly accomplished by using several unrelated command-line utilities. For example, the source code files are written using a text editor program. The source code files are compiled into object code files using a separate compiler program. A linker utility, sometimes a part of the compiler program, combines the object code files into an executable program. Larger software projects may require a build-automation utility to coordinate the compiling and linking stages of the software build. A separate debugger program may be used to locate and understand bugs in the computer program.

An Integrated Development Environment (IDE) is computer software adapted to help computer programmers develop software quickly and efficiently. An IDE provides features to create, modify, compile, deploy, and debug computer programs. An IDE normally consists of a source code editor, a compiler or interpreter, build-automation utilities, and a debugger tightly integrated into a single application environment. Modern IDEs often include a class browser and an object inspector to assist in object-oriented development with a programming language such as C# or Java™. Some IDEs also include the capability to interface with a version control system such as CVS or Visual SourceSafe or various tools to facilitate the creation of a graphical user interface (GUI).

An IDE offers a quick and efficient way to develop computer software. Learning a new programming language becomes easier through the use of an IDE since the details of how component parts piece together is handled by the IDE itself. The tight integration enables greater productivity since different steps of the development process can happen concurrently and/or automatically. For example, source code may be compiled in the background while it is being written, thus immediately providing feedback such as syntax errors. This integration also allows for code completion features so that the IDE can provide the programmer with valid names for various elements of the language based on the initial input of the programmer, thus reducing the time spent reviewing documentation.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

The subject disclosure, briefly described, relates to layered or layering of type systems. The type systems can be layered in a dependency order. The first layer can be base or native type system and other supplemental type systems can be added to further define allowable values. Accordingly, each programmatic element can be associated with a plurality of types from multiple type systems.

In accordance with one disclosed aspect, the layered type system can be employed by a compiler to enhance static type checking and thus program reliability. By way of example and not limitation, dynamic languages can be incorporated into a source code file and statically type checked utilizing one or more supplemental type systems.

According to another disclosed aspect, the layered type systems can be utilized within a development environment to provide enhanced programmatic support. For example, automatic statement completion, tool tips, error/warning notification, as well formatting can all be extended to support multiple layered type systems. Furthermore, information can be supplied which identifies allowable values for programmatic elements based on the layered type systems.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 3 is an exemplary diagram depicting how layered types can be employed.

DETAILED DESCRIPTION

Figure 1:
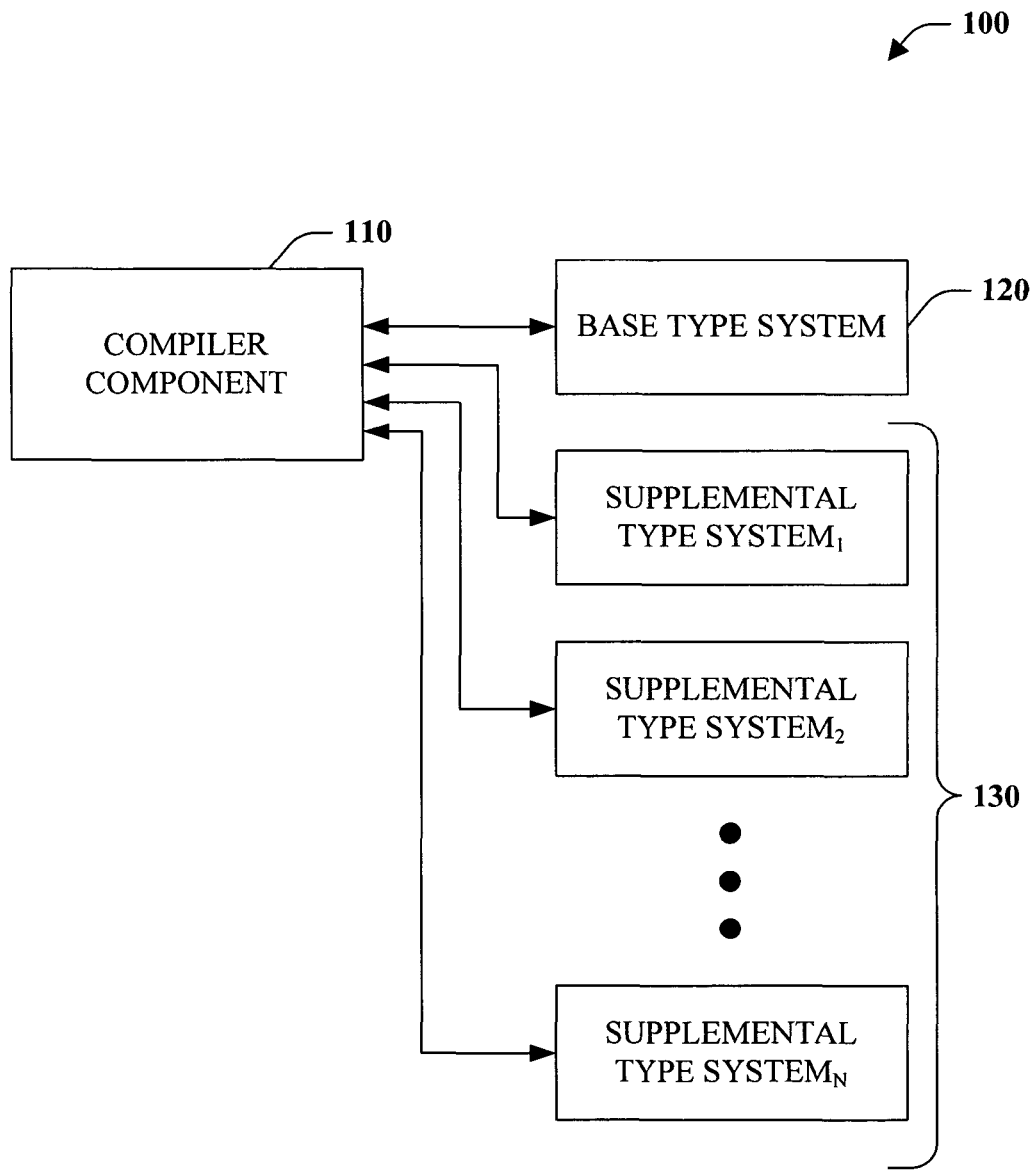
FIG. 1 is a block diagram of an integrated development environment.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "environment" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the terms "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A "type system" as used herein is a system that describes information about data. In particular instances, a type system can also be said to constrain, classify or set out rules with respect to data. Alternatively, the type system can be said to define allowable values. For example, a variable or expression of type integer is confined to being a positive or negative whole number including zero. A type system can come in many forms and can include but not limited to a formal type system, metadata, data models, schemas, and contracts, except when such terms are separately utilized or in light of the context in which the term is used.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, jump drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Turning initially to FIG. 1, an integrated development environment 100 is depicted. The integrated development (or design) environment 100, or simply development environment 100, facilitates development or design of computer programs. The environment 100 includes, among other things compiler component 110, base type system 120, and supplemental type systems 1 to N 130 (where N is an integer greater than one). Conventionally, integrated development environment (IDE) 100 includes a native or base type system 120. The base type system can be a common type system for a plurality of programming languages. For example, the native type system can support one or more object-oriented programming languages. IDE 100 can also include one or more supplemental type systems 130. Supplemental type systems 130 are layered such that each programmatic element, such as an expression, is associated with a type from the base type system 120 as well one or more supplemental type systems 130. The different type systems need not be merged and there is no change in the representation of any type from any of the type systems employed. The various type systems are layered so each programmatic element can be associated with multiple types from multiple type systems. Thus, it should be appreciated that the IDE 100 can support multiple data models and their type systems in the same program. Compiler component 110 can interact with both the base and the supplemental type systems to facilitate program compilation. Use of supplemental type systems can enhance static type checking of programs thereby enabling early detection of errors and improving program reliability. This can be especially significant with respect to dynamic languages, as the type systems of such languages can be layered on top of the base type system 120 to enable static checking rather than dynamic checking. Consider for example, a program that includes a mixed or multi-language source. The host language could be a statically typed language, which could be embedded with one or more dynamic type languages. The type system and/or data model associated therewith can be added to the integrated development environment 100 thereby enabling the host language to be statically checked with the base type system 120 and the embedded dynamic type language to be statically checked utilizing the supplemental type system 130.

Figure 2:
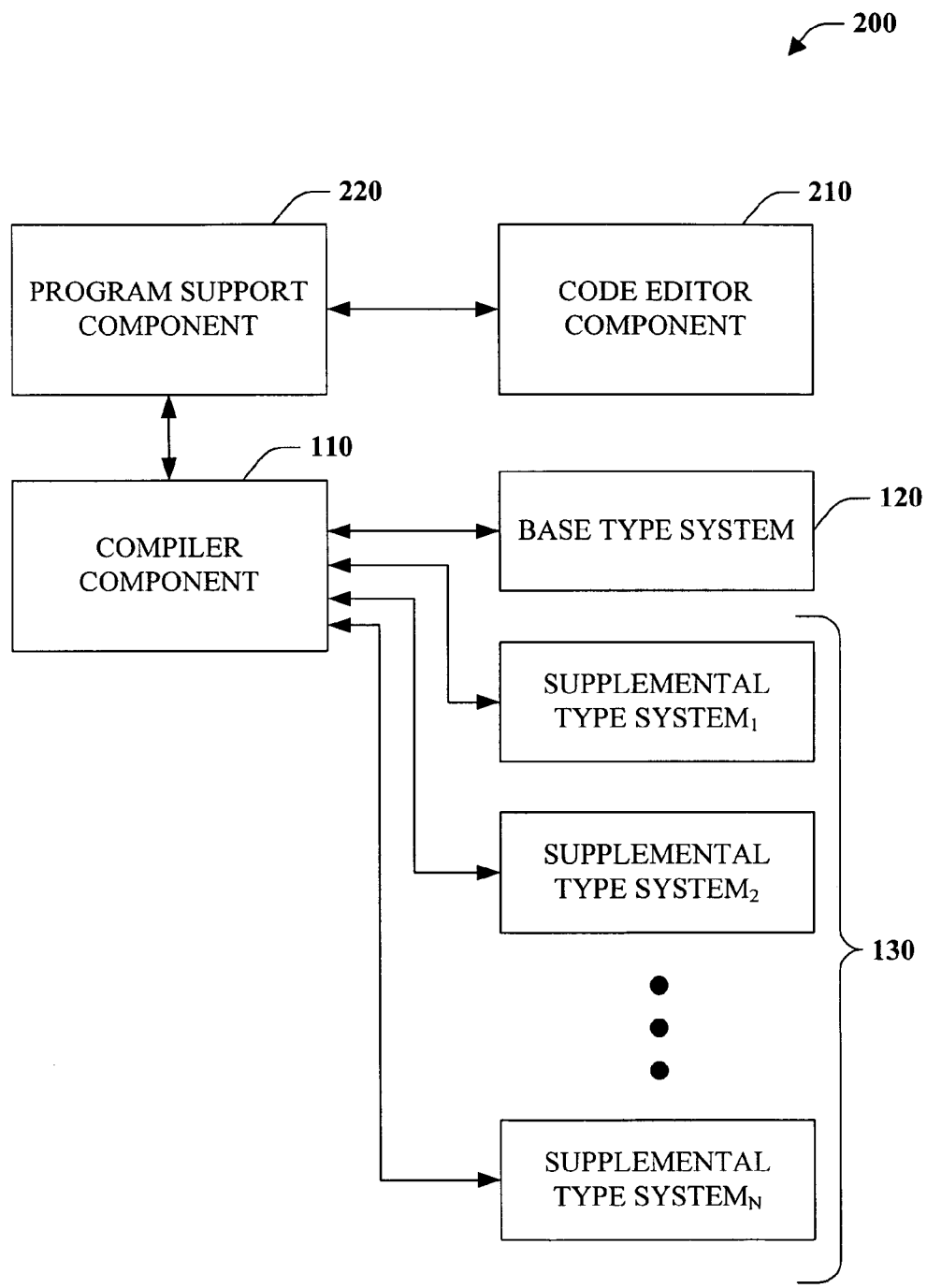
FIG. 2 is a block diagram of an integrated development environment.

FIG. 2 depicts another integrated development environment 200. Similar to IDE 100, integrated development environment 200 can include or comprise a compiler 110, base type system 120, as well as one or more supplemental type systems 130. The IDE 200 can have a base type system 120 associated therewith. IDE 200 can also support one or more supplemental type systems 130. Supplemental type systems 130 can be layered such that each programmatic element is associated with the base type system 120 as well as one or more supplemental type systems 130. In other words, the type systems are layered rather than merged. Compiler component 110 can cooperate and interact with the base type system 120 as well as supplemental type systems 130. Interaction with a myriad of supplemental type systems 130 in addition to the base type system 120 can vastly enhance the type checking ability of the compiler component 110.

It should be appreciated that IDE 200 can also include a code editor component 210 to receive and display code. For example, as a programmer enters code, the code editor component can process the code and display it in a visually appealing manner. Code editor component 210 can interact with program support component 220. Program support component 220 can provide assistance to programmers, for example, as a program is entered into the code editor component 210. As will be described in further detail infra, such support can include visual support such as intelligent hinting, automatic completion, and error identification, among others.

Compiler component 110 can be communicatively coupled to the support component 220. In particular, compiler component 110 can provide support component 220 with type information to enable support component 220 to provide context specific aid including but not limited to that involved in auto completion and tool tips. It should be appreciated that compilation can be done in the background so as not to interrupt program entry. To be affective during program development, types need to be known prior to execution.

Dynamic languages provide a way to write a program utilizing objects whose type information is known only at run time. Additionally, in many cases a user can extend an existing type by specifying additional metadata about objects other than the actual type information, for example, expressions that describe an allowable set of values such as regular expressions for strings. Because type information is only available at run time, one of the biggest problems with dynamic languages and the additional metadata for objects is that the IDE provides very little, if any, program support such as list of available members, auto completion, tool tips, error information, and return type information for these objects. The lack of these features in the IDE substantially reduces the productivity of the developer who is writing a program that utilizes dynamic members and extended types.

As an example, consider the following code:

```
Class Person
    Name As String;
    Age As Integer;
End Class
Dim P As Person = new Person;
```

Here, class "Person" is defined to have two members "Name and Age." Subsequently, variable "P" is defined as type "Person." This is an example of static typing. In this instance, if "P.Foo" were entered in the code editor 210, the compiler would generate an error. However, if in the IDE code editor 210 one entered "P." the support component 220 could cause a drop down list to be generated in code editor 210 suggesting completion of this statement with either "Name" or "Age." Alternatively, consider the following dynamic language code snippet:

```
Dim D As Object = new Person( )
```

Its static type is "Object" so if one were to enter "D.Foo," the compiler would allow it, because it is an "Object." However, a run time error would be generated, which is undesirable. Furthermore, if one were to enter "D." in the code editor 210, the support component could not provide much help. In fact, it could simply identify "D" as having type "Object" from the native type system.

Consider another example in which an object is created base on some instance data. This object can be an XML document, ADO.Net DataReader or any other object that contains data. In dynamic form of such objects, the data can be accessed as regular members of objects. For example:

```
static void UseDynamicXPathDocument(string bibLocation) {
    DynamicXPathDocument bibDoc = new DynamicXPathDocument(bibLocation);
    foreach (DynamicXPathNavigator book in bibDoc.bib.book)
        Console.WriteLine((string)book.title);
}
Similarly, in PHP (Hypertext Preprocessor) using the SimpleXML object one can
author a similar program as follows:
<?php
$bibDoc = simplexml_load_file($bibLocation);
foreach ($bibDoc->book $book) {
    echo $book->title </br>
}
?>
```

One reason that an IDE cannot provide visual or other support is because these properties are not part of a base type system such as the object data model, since they actually represent types from some other data model (e.g., XML, relational . . . ). Typical IDEs only know how to interact with the native data model (e.g., object data model) and the metadata that describes this data model. They do not know how to interact and display metadata from other data models. For example, in the code sample above, consider the scenario where a user enters "$book->." One might expect to see the list of available elements/attributes in the XML document, which in this example could include "title" and "author" elements, but this is not the case.

IDE 200 provides a solution to at least this problem. As discussed, IDE 200 supports multiple type systems that can be layered in a dependency order. The first layer can be the natively supported by the IDE (i.e., base type system 120). In the example above, that could be the object type system. The other layers 130 can be type systems that the object type system interacts with including but not limited to the relational and XML type systems.

As can be observed from the previous examples, in dynamic languages the types from the other type systems can be accessed as regular member access in the object type system. The information about the dynamic members can be presented by accessing another type system and obtaining the information to be displayed in the IDE. For instance, when a user employs the IDE or more specifically the code editor 210, the applicable type information based on the metadata from that object in the object type system and the applicable metadata from the other data models can be employed, and a decision can be made as to how to present the available information to the user using different visual symbols such as icons, fonts and colors.

Turning briefly to FIG. 3, a diagram 300 is provided in furtherance of the discussion of base and layered type systems. On the vertical axis, there is a division between an object type system as the base or native IDE type system and layered or supplemental type systems. In particular, the regular expression, XML and relational type systems are represented. As shown, every object can be associated with multiple types in multiple type systems. In particular, a string can be further constrained by the regular expression type system to include some letters followed by some numbers. XElement can be further confined by the layered type system to be an XML address type. Finally, a dataset can be further restricted by a relational type system to be a customers table. IDE 200 (FIG. 2) can access the multiple types and display information appropriately.

Figure 4:
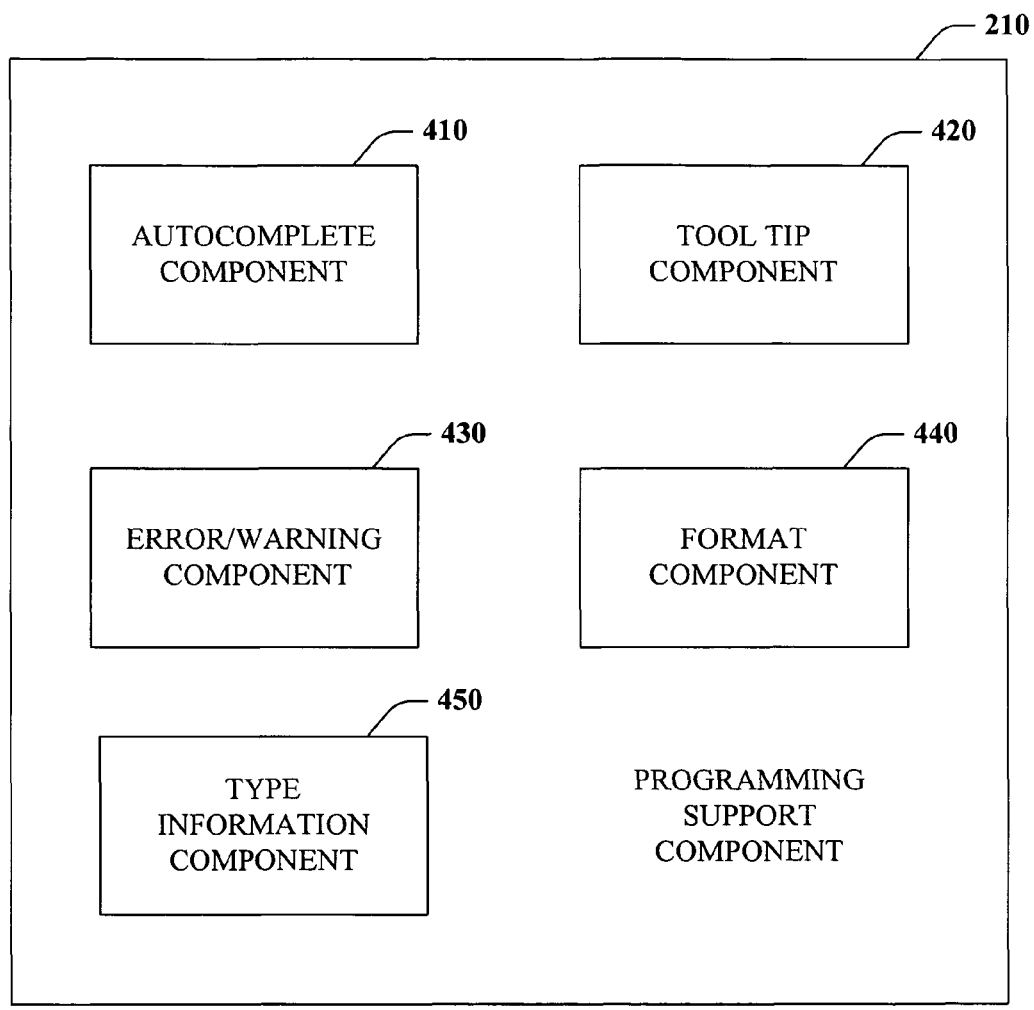
FIG. 4 is a block diagram of a programming support component.

FIG. 4 illustrates a programming support component 210 in accordance with an aspect of the disclosed subject matter. Programming support component 210 includes auto complete component 410, tool tip component 420, error/warning component 430, format component 440, and type information component 450. Auto complete component 410 provides a mechanism for looking ahead and suggesting programmatic elements based on both the base type system and any layered or supplemental type systems. For example, upon entering a variable and a dot (e.g., P.) auto complete component 410 can cause a drop down menu to appear and populate it with possible values based on the type of the variable. Tool tip component 420 can cause a small information box to appear with respect to an item over which the cursor hovers and/or in response to depression of a predetermined combination of one or more key strokes. The tool tip component 420 can populate the box with information regarding either or both of base and layered type systems. For example, the layered data model return type of an expression could be displayed in addition to information pertaining to the base type system return type, where applicable. Error/warning component 430 can provide an indication of an error or possible error such as a squiggly underline based on the base type system as well as one or more supplemental or layered type systems. Indication of error or possible error can be the same or different for base and layered type systems. For example, the squiggly underline may be a different color for errors or possible errors based on one or more layered type systems than for those based on the native type system. Format component 440 can provide and display special icons, symbols, and/or colors for dynamic members or other members where information about them exists in a supplemental type system or another data model. Type information component 450 can provide a user information regarding constraints imposed by or values allowed by the base and/or layered type systems. For example, a base type system may constrain a variable to a string and a layered type system can further confine that string to particular values (e.g., satisfy a regular expression). This information can be provided to a user as a reference to facilitate correct code specification.

Figure 5:
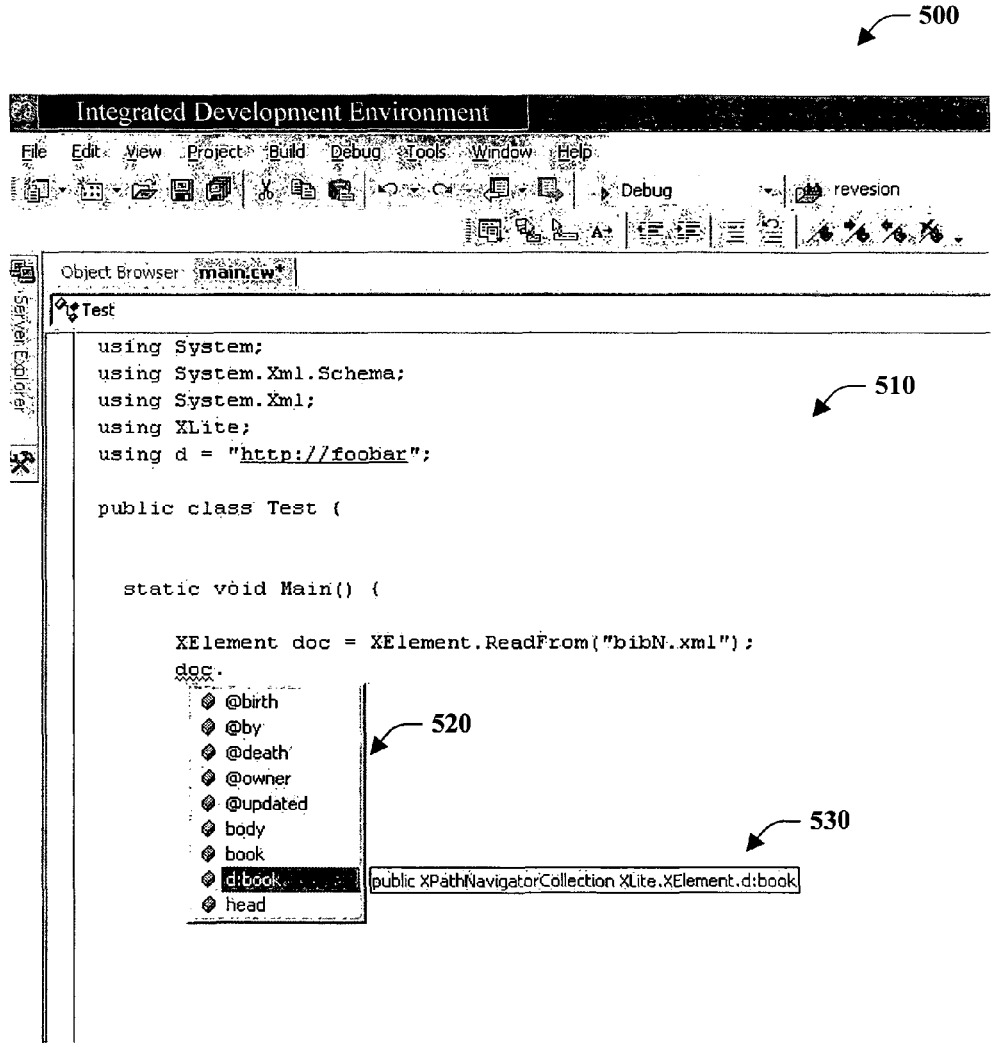
FIG. 5 is a screen shot of an integrated development environment graphical user interface.

FIG. 5 is a screen shot of a graphical user interface 500, for example, provided by a development environment. In particular, a code editor is provided at 510, which provides is a mechanism for displaying code, for instance, entered and/or opened within the development environment. Several type systems or data models are declared for the displayed program employing the "using" construct. As shown, the following code is specified:

```
XElement doc = XElement.ReadFrom("bidN.xml");
doc.
```

In response to "doc.", a drop down menu 520 is presented to facilitated statement completion. The menu is populated with a plurality of values from multiple layered type systems. Upon rolling over or otherwise identifying or selecting an element, a tool tip information box 530 is displayed. Here, information is displayed pertaining to the type of the identified or highlighted menu item.

Figure 6:
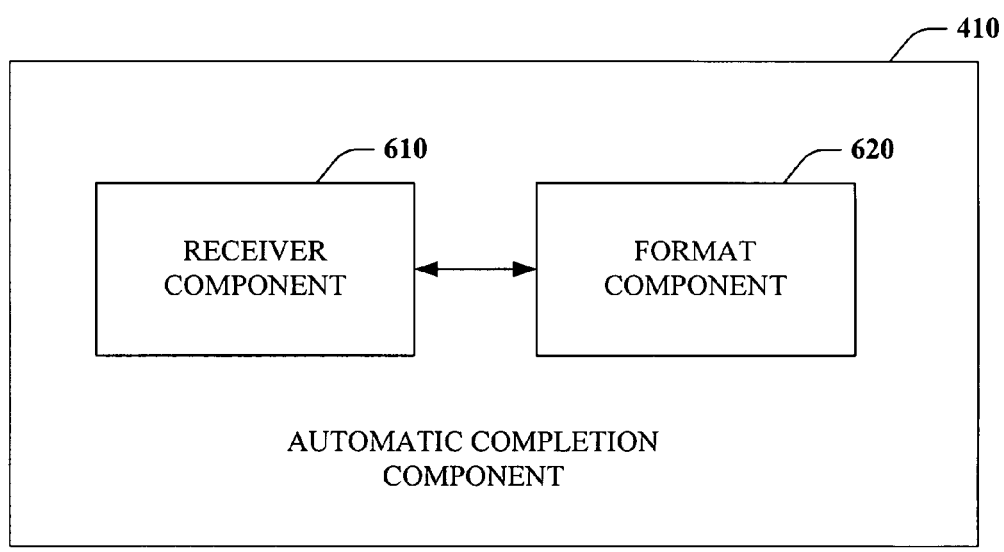
FIG. 6 is a block diagram of an automatic completion component.

Turning to FIG. 6 an automatic completion component 410 is illustrated in accordance with an aspect of the disclosed subject matter. Completion component 410 can include a receiver component 610 and a format component 620. Receiver component receives, retrieves or otherwise obtains programmatic elements that are available for statement completion. These programmatic elements can come from the base type system and one or more supplemental or layered type systems. Receiver component 610 is communicatively coupled to format component 620. The format component 620 retrieves these programmatic elements and formats them into a comprehensible format for display. For example, the format component 620 could partition elements of particular type systems into blocks or by use of differing colors, among other things. Additionally or alternatively, format component 620 can take context into consideration when formatting programmatic elements. For instance, a determination can be made as to which programmatic element is most likely to be selected. That element can be presented first followed incrementally in order of likelihood of selection. Such formatting can be continuously modified based on context such as code entered by a user to present elements in a logical and comprehensible format.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components and/or sub-components may be combined into a single component providing aggregate functionality. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For example, programming support component 210 could utilize artificial intelligence, machine learning or like mechanisms to facilitate providing users with the most relevant help and information. For instance, support component 210 could infer, as that term is defined herein, the most appropriate programmatic element to provide the user with based on context and/or actions.

In view of the exemplary systems described supra, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 7:
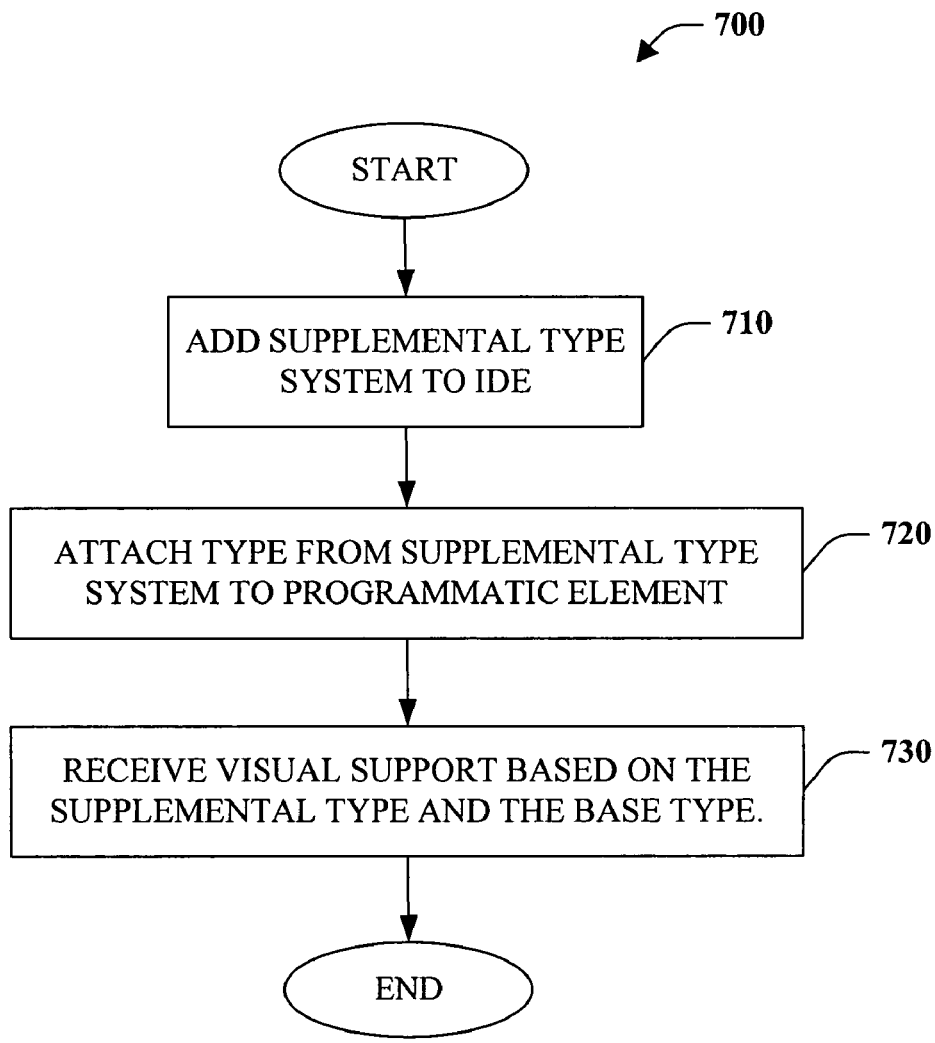
FIG. 7 is a flow chart diagram of a method of interacting with an IDE that supports layered type systems.

Turning to FIG. 7, a method 700 of interacting with an IDE that supports multiple type systems is illustrated. At reference numeral 710, a supplemental or layered type system is added to an integrated development environment. In one instance, this can be accomplished by utilizing a reference mechanism provided by an IDE project. For example, user can add references to metadata information of other type systems such as relational and XML schemas. Alternatively, a type system can be added by adding metadata information to individual code files, for instance by utilizing code file properties. For example, an external schemas property can be added to the file. This property can then hold reference to additional metadata from other type systems. Still further yet, reference to a type system can be added directly to the code itself, for instance in the global declaration section. At 720, types from the supplemental type system can be attached to programmatic elements or objects. There are multiple ways to attach layers of types from different type systems over an object, for example, including but not limited to using namespaces, compile-time meta-object protocol, phantom types, custom attributes, type inference, and contracts.

Namespaces can define collections of names that can be utilized in a program. For example, if a user declares XmlNamespace in his/her code file, only metadata from that namespace will be available to applicable expressions. Consider the following code snippet:

```
Imports XmlNamespace "http://tempURI"
Module Module1
    Sub Main( )
        Dim x = XElement.ReadFrom("c:\temp\foo.xml")
    End Sub
End Module
```

Here, the default namespace is "http://tempURI," thus by default the variable "x" is associated with that namespace. Accordingly, it is also associated with global element types in a referenced schema which its target namespace matches the variable "x" namespace.

Layers of types can also be attached using design time meta-object protocol, which can be applied recursively. This method decouples the IDE from the additional type systems using a meta-object protocol. That is, using design time dynamic dispatch. In this approach, the type from the base type system, such as an object type system, includes or is associated with additional methods that allow the IDE to obtain information regarding additional type layers. More generally speaking, each programmatic element and/or expression has an associated type where the types know about other types layered thereon and can be queried for information.

In the following example, assume that an XML schema that applies to the "bib" document is referenced in a project based on one of the methods described above. The object data model type of "x.book" expression is IEnumerable(Of XElement). The associated XML type of this expression is the XML schema element "<xsd:book . . . >."

```
ModuleModule1
    SubMain( )
        Dim x = XElement.ReadFrom("c:\temp\bib.xml")
        Dim y = x.book.author
    EndSub
EndModule
```

The compiler can obtain the XML schema type by requesting that (using the meta-object protocol) the object type (XElement) provide it with the XML schema element based on the information that the compiler has, such as the referenced schemas, the XML type of the qualifier expression of the specific identifier, the namespace declarations and the like. The XML type can then be stored by the compiler. This process can be executed recursively as expressions are compiled. For example, the expression "x.book.author" is compiled as follows: First, the expression "x.book" is compiled and the extra type information is associated with this expression. The expression "x.book.author" is compiled and the type information form the prior expression is utilized to obtain the additional type information.

Phantom types can be used where the additional type information is specified using a special notation. For example, in the following code segment the variable "x" of object type XElement is associated with the global elements type in a schema whose target namespace is "http://tempURI."

```
Imports XmlNamespace x = "http://tempURI"
Module Module1
    Sub Main( )
        Dim x as XElement(Of x:*) = XElement.ReadFrom(". . .")
    End Sub
End Module
```

Yet another way to attached layers of types from a different type system over an object or programmatic element is by employing custom attributes. For example, a custom attribute mechanism can be employed to attach metadata to a type that applies to a specific expression. A variable string could be defined to be of a length of three characters, for instance. In Visual Basic, this can be specified as "<VBFixedString(3)> Dim b As String." This same mechanism can be extended to provide additional type information. For example, support for regular expressions can be provided such as "<RegEx([A-Z]*|[0-9]+)>Dim b As String." Additionally or alternatively support can be provided for the XML type system, for example "<XmlType(xs: element name="x:book")>Dim b As XElement."

Types for layered type systems can be attached via inference from another layer. For example, in cases where the type from the second layer is not specified by the programmer, the compiler can infer it based on other information such as the type of a base or object type, the namespace information and/or the referenced schemas for other type systems. For instance, the type of the variable "x" can be inferred to be the union of the global elements in the inferred schema:

```
ImportsXmlNamespace x ="http://tempURI"
ModuleModule1
    SubMain( )
        Dim x as XElement = XElement.ReadFrom("...")
    EndSub
EndModule
The above code snippet can be inferred to be:
ImportsXmlNamespace x ="http://tempURI"
ModuleModule1
    SubMain( )
        Dim x as XElement(Of x:*)= XElement.ReadFrom("...")
    EndSub
EndModule
```

Additionally, contracts can be utilized to attach layers of types to a programmatic element. A user can define a contract about the type of a specific element and/or expression. For example, a user can assert that a string satisfies a certain regular expression constraint or validates as a certain schema by declaring:

```
Dim X As String Ensures Matches (Value, "[A–Z]+")
Dim E As XElement Ensures ValidatesAs (x:book)
```

Referring back to FIG. 7 and method 700, once a layered type is of a different type system is attached to programmatic element, at 720, visual support can be received based on the base type as well as supplemental types, at 730. For example, this can correspond to, among other things, auto completion in which upon partial specification of a statement such as "X." proper programming elements that complete the statement can be displayed in a drop down menu for selection. As mentioned, these elements can be associated with any of the layered type systems, base and/or supplemental.

Figure 8:
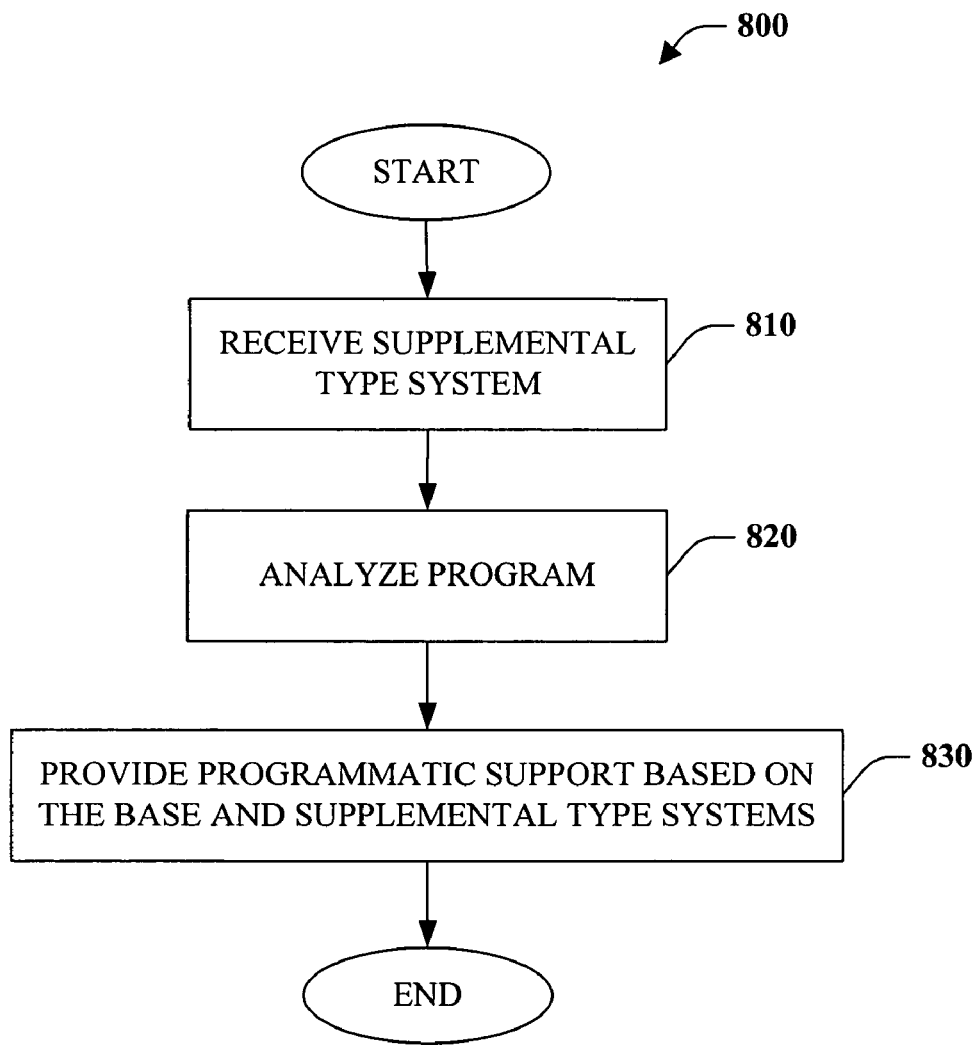
FIG. 8 is a flow chart diagram of a method of interacting with layered type systems.

FIG. 8 is depicts a method 800 of interacting with layered type systems. At reference numeral 810, a supplemental type system is received. This type system can be in addition to a base type system of an integrated development environment. At 820, a computer program can be analyzed in light of all layered type systems including base and supplemental type systems. From the analysis, one or more types can be associated with programmatic elements. For instance, a variable "x" can be associated with an object type string as well as a regular expression type "([A-Z]*|[0-9]+)." Based at least in part on the identified types, programmatic support can be provided at 830. In other words, programming help can be supplied based on the layered type systems including base and supplemental type systems. The support can correspond to visual support including but not limited to providing automatic statement completion, tool tips, error and/or warning indications, and an easily comprehensible display format.

Figure 9:
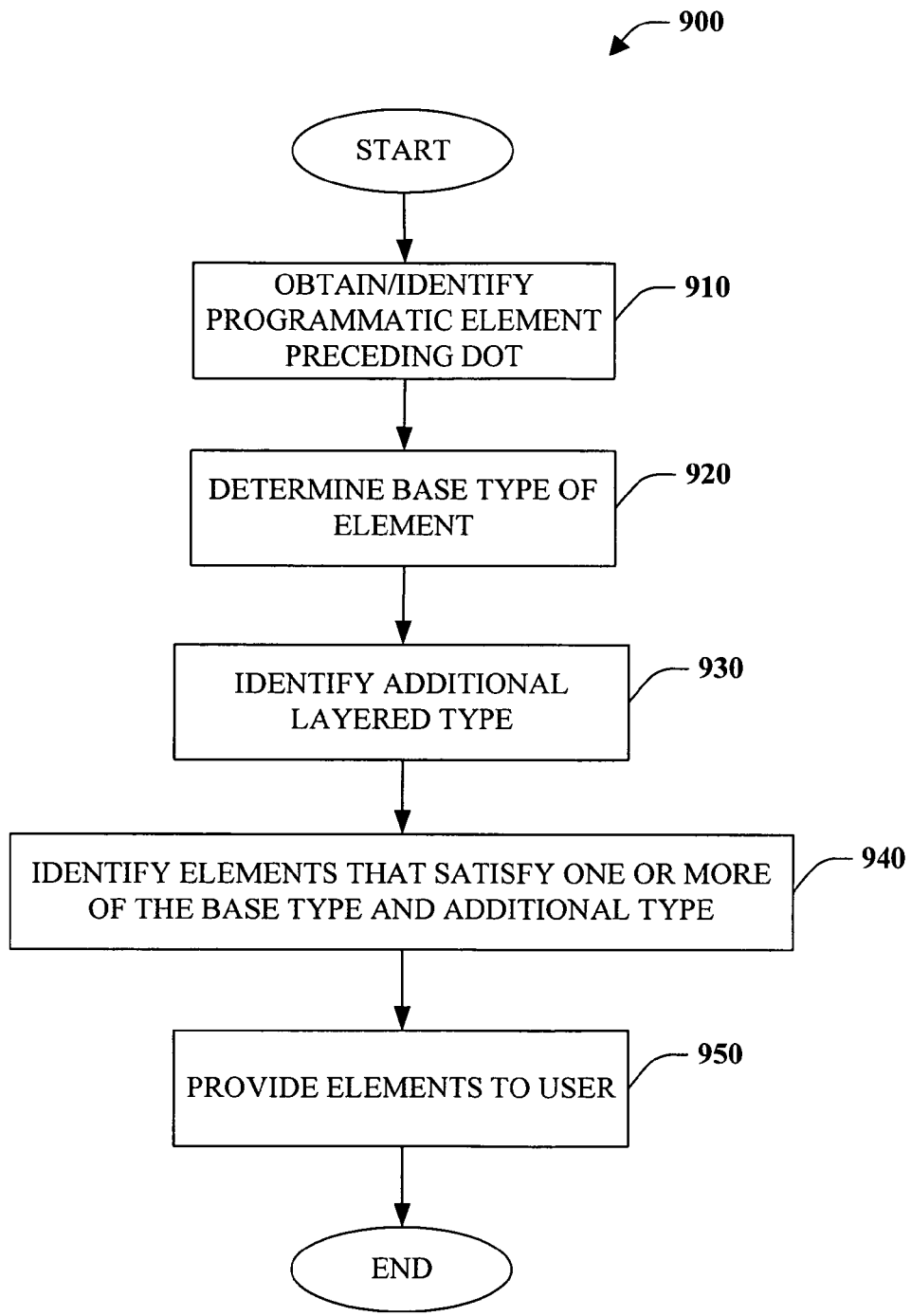
FIG. 9 is a flow chart diagram of an automatic statement completion methodology.

Turning to FIG. 9, an automatic statement completion methodology 900 is illustrated. At 910, a programmatic element preceding a dot "." is received or otherwise identified. At reference numeral 920, the base type for the identified programmatic element is determined. At 930, any additional layered types associated with the element are determined. Other programmatic elements including but not limited to classes, attributes or identifiers that satisfy one or more of the base and additional type systems are identified at 940. At 950, the identified elements are provided to a user for selection there amongst to complete a statement. The identified elements can be presented in a drop down menu as part of the code editor. Furthermore, elements may be identified differently for example by color or in a different block to identify their association with a particular type system.

Figure 10:
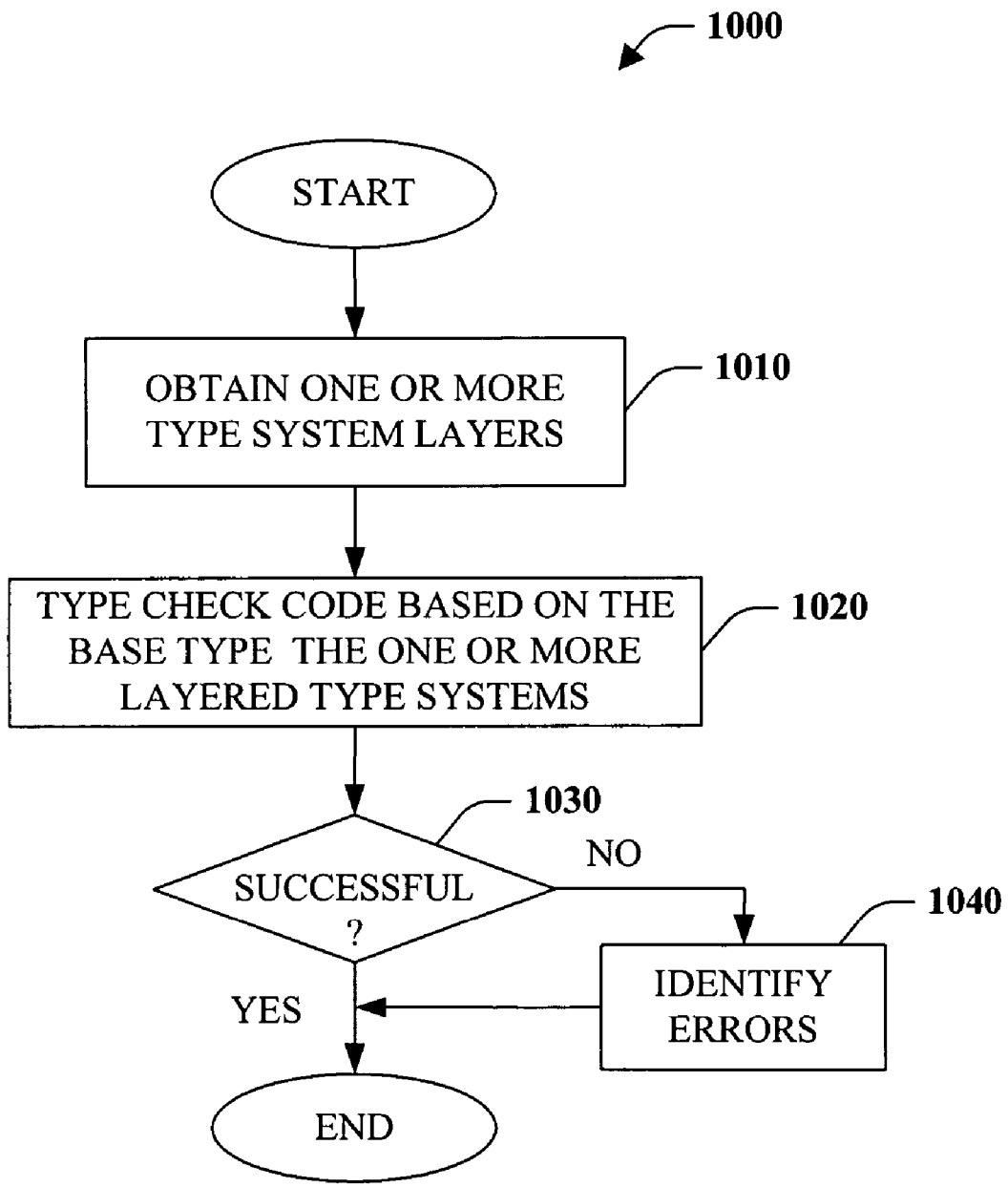
FIG. 10 is a flow chart diagram of a type checking methodology.

FIG. 10 depicts a type checking methodology 1000 in accordance with an aspect of the disclosed subject matter. At reference numeral 1010, one or more layered type systems are obtained. The type systems can include a base type system as well as one or more supplemental type systems. The type systems can be referenced in programmatic code, metadata associated with the code and/or as part of an IDE project, among other ways. Once the type systems are obtained, code can be type checked based on the one or more layered type systems at 1020. At 1030, a determination is made as to whether the type checking was successful meaning it completed without errors. If yes, the method terminates. If no, the identified errors are provided at 1040 and the method terminates.

Figure 11:
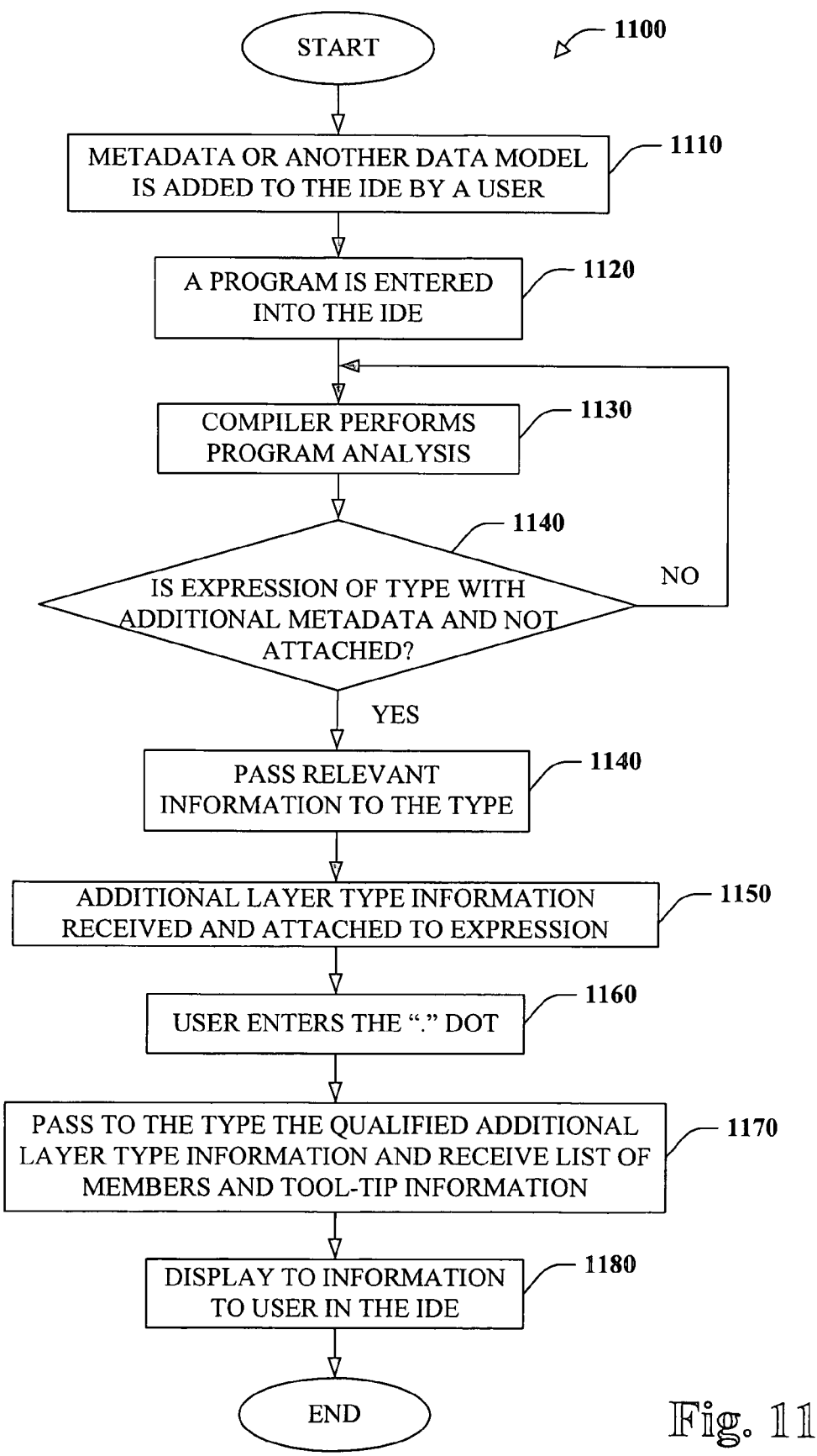
FIG. 11 is a flow chart diagram of a method for employing layered type systems.
Figure 12:
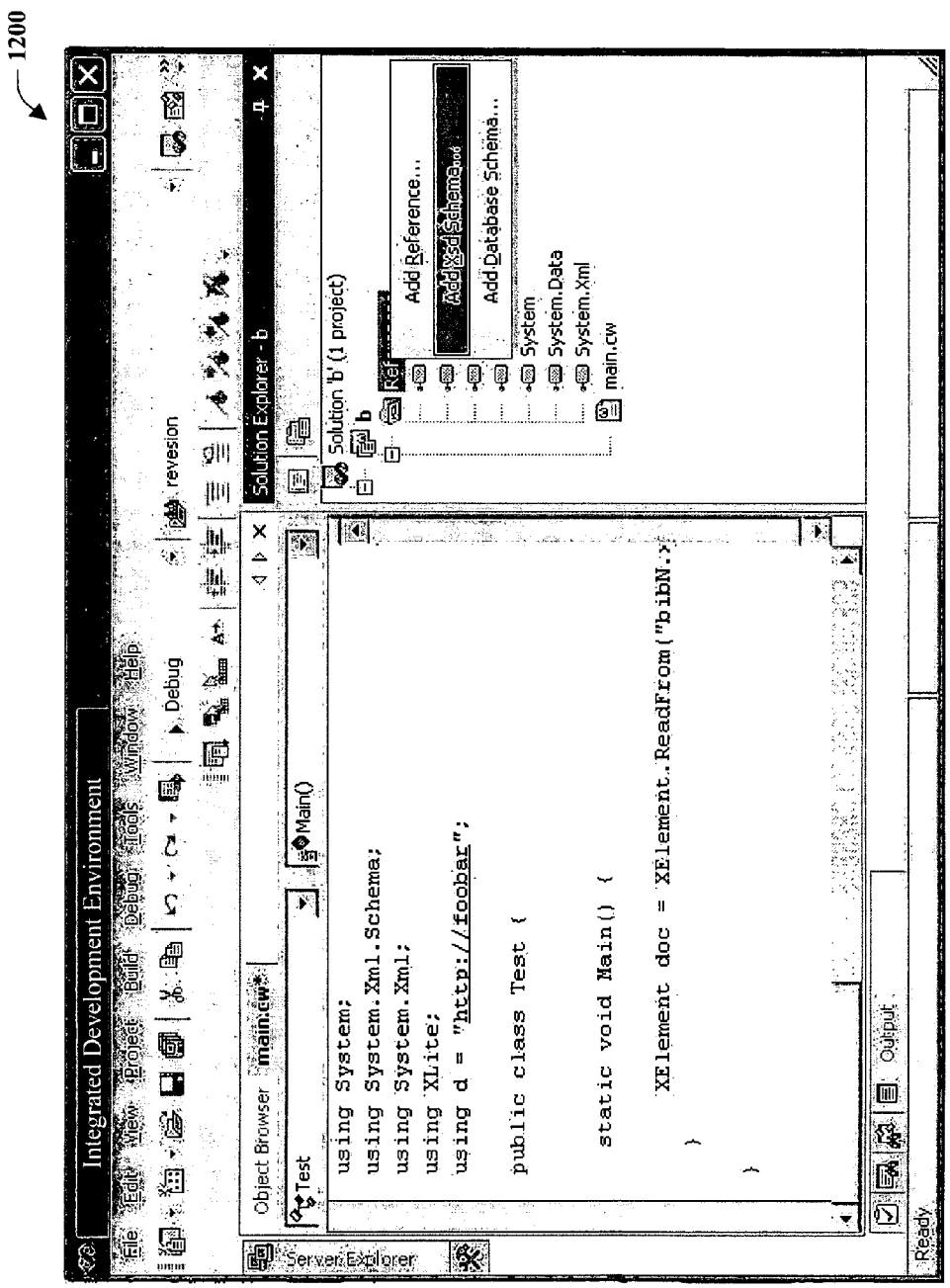
FIG. 12 is a screen shot illustrating a method of adding type system layers in an integrated development environment.

Turning to FIG. 11, a method 1100 is provided for employing layered type systems. Method 1100 is only one manner of employing layered types and as such is not meant to be limiting on the claimed subject matter in any manner. Method 1100 is provided solely to provide context for how layered types can be employed. At 1110, metadata, another data model or type system are added to an integrated development environment by a user. For example, as illustrated graphically by the screenshot 1200 in FIG. 12, the metadata can be added to the project as a reference utilizing a similar mechanism that can be employed for referencing an assembly or web service. Selecting "Add Xsd Schema . . . " adds an XSD with its target namespace to the IDE's project references list. This makes the schema available to the compiler. Returning to method 1100, at 1120, a program is entered or opened in the IDE. At reference numeral 1130, a compiler performs program analysis on the program in the IDE. During program analysis, a determination can be made at 1140 as to whether an expression is of a type with additional metadata and does not have the additional layer attached. If no, the program analysis is continued until complete at 1130. If yes, the relevant information is passed to the type such as referenced metadata, in the project, relevant namespaces, and/or qualifier types. At 1150, the additional layer is received and attached to an expression. By way of example, the compiler may include or interact with a computer readable medium that stores all expressions or elements in a program and the applicable types associated therewith. At 1160, a user can enter the dot operator. At 1170, the type is passed (e.g., through meta object protocol) the qualifier additional layer type information and a list of members and tool tip information is received. At 1180, the information is displayed in the IDE.

Figure 13:
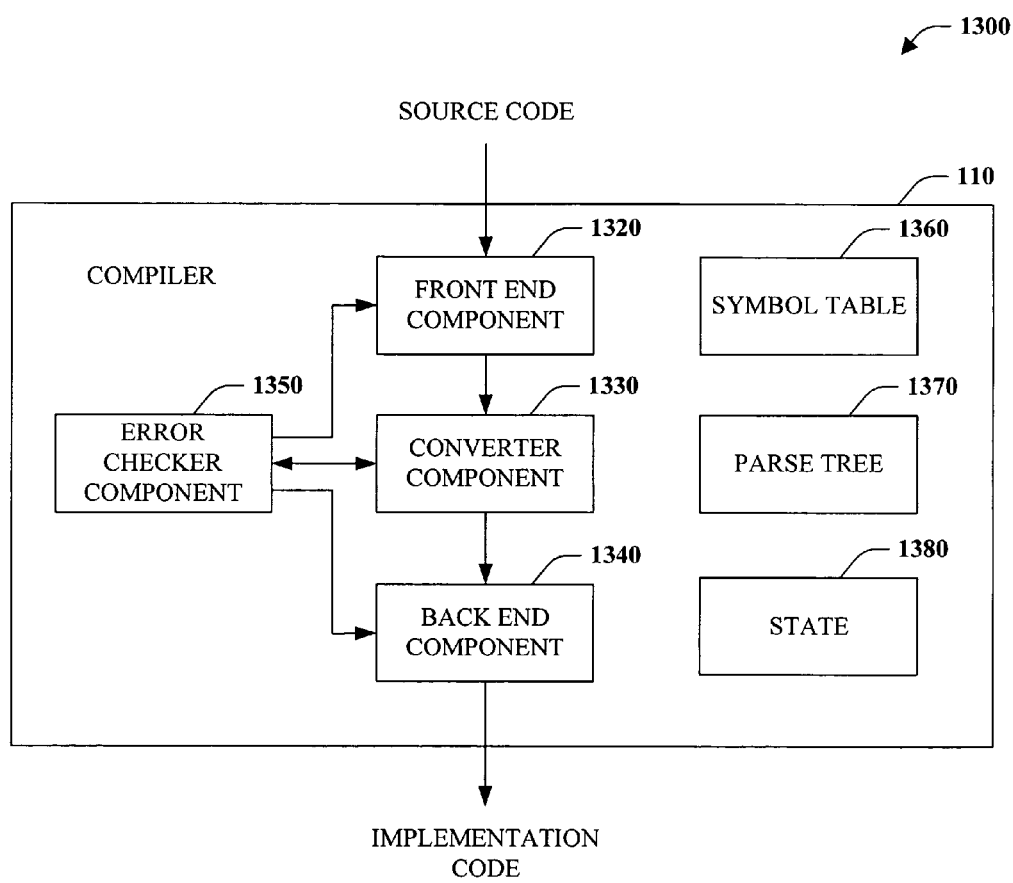
FIG. 13 is a schematic block diagram of an exemplary compilation environment.

FIG. 13 is a block diagram depicting a compiler environment 1300 that can be utilized in conjunction with various systems, methods, and components provided herein including but not limited to the IDE 100 and 200 (FIGS. 1 and 2). In particular, compiler environment 1310 can produce implementation code (e.g., executable, intermediate language . . . ). The compiler environment 1300 includes a compiler 110 including front-end component 1320, converter component 1330, back-end component 1340, error checker component 1350, symbol table 1360, parse tree 1370, and state 1380. The compiler 110 accepts source code as input and can generate implementation code as output (e.g., intermediate language code, executable . . . ). The input can include but is not limited to source code comprising programmatic elements and/or expressions in one or more programming languages as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

Compiler 110 can accept as input a file having source code associated with processing of a sequence of elements. The source code may include mixed-language code including associated with a number of type systems. Compiler 110 may process source code in conjunction with one or more components for analyzing constructs and generating or injecting code.

A front-end component 1320 reads and performs lexical analysis upon the source code. In essence, the front-end component 1320 reads and translates a sequence of characters (e.g., alphanumeric) in the source code into syntactic elements or tokens, indicating constants, identifiers, operator symbols, keywords, and punctuation among other things.

Converter component 1330 parses the tokens into an intermediate representation. For instance, the converter component 1330 can check syntax and group tokens into expressions or other syntactic structures, which in turn coalesce into statement trees. Conceptually, these trees form a parse tree 1370. Furthermore and as appropriate, the converter module 1330 can place entries into a symbol table 1160 that lists symbol names and type information used in the source code along with related characteristics.

A state 1380 can be employed to track the progress of the compiler 110 in processing the received or retrieved source code and forming the parse tree 1170. For example, different state values indicate that the compiler 110 is at the start of a class definition or functions, has just declared a class member, or has completed an expression. As the compiler progresses, it continually updates the state 1380. The compiler 110 may partially or fully expose the state 1380 to an outside entity, which could subsequently provide input to the compiler 110.

Based upon constructs or other signals in the source code (or if the opportunity is otherwise recognized), the converter component 1330 or another component can inject code to facilitate efficient and proper execution. Rules coded into the converter component 1330 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1360 and the parse tree 1370, a back-end component 1340 can translate the intermediate representation into output code. The back-end component 1340 converts the intermediate representation into instructions executable in or by a target processor, into memory allocations for variables, and so forth. The output code can be executable by a real processor, but the invention also contemplates output code that is executable by a virtual processor.

Furthermore, the front-end component 1320 and the back end component 1340 can perform additional functions, such as code optimization, and can perform the described operations as a single phase or in multiple phases. Various other aspects of the components of compiler 1310 are conventional in nature and can be substituted with components performing equivalent functions. Additionally, at various stages of processing of the source code, an error checker component 1350 can check for errors such as errors in lexical structure, syntax errors, and even semantic errors (e.g., type checking). Upon detection error, checker component can halt compilation and generate a message indicative of the error. Furthermore and as previously described, the compiler 110 can associate one or more types from a multitude of type systems with programmatic elements to facilitate not only type checking but also intelligent program support.

Figure 14:
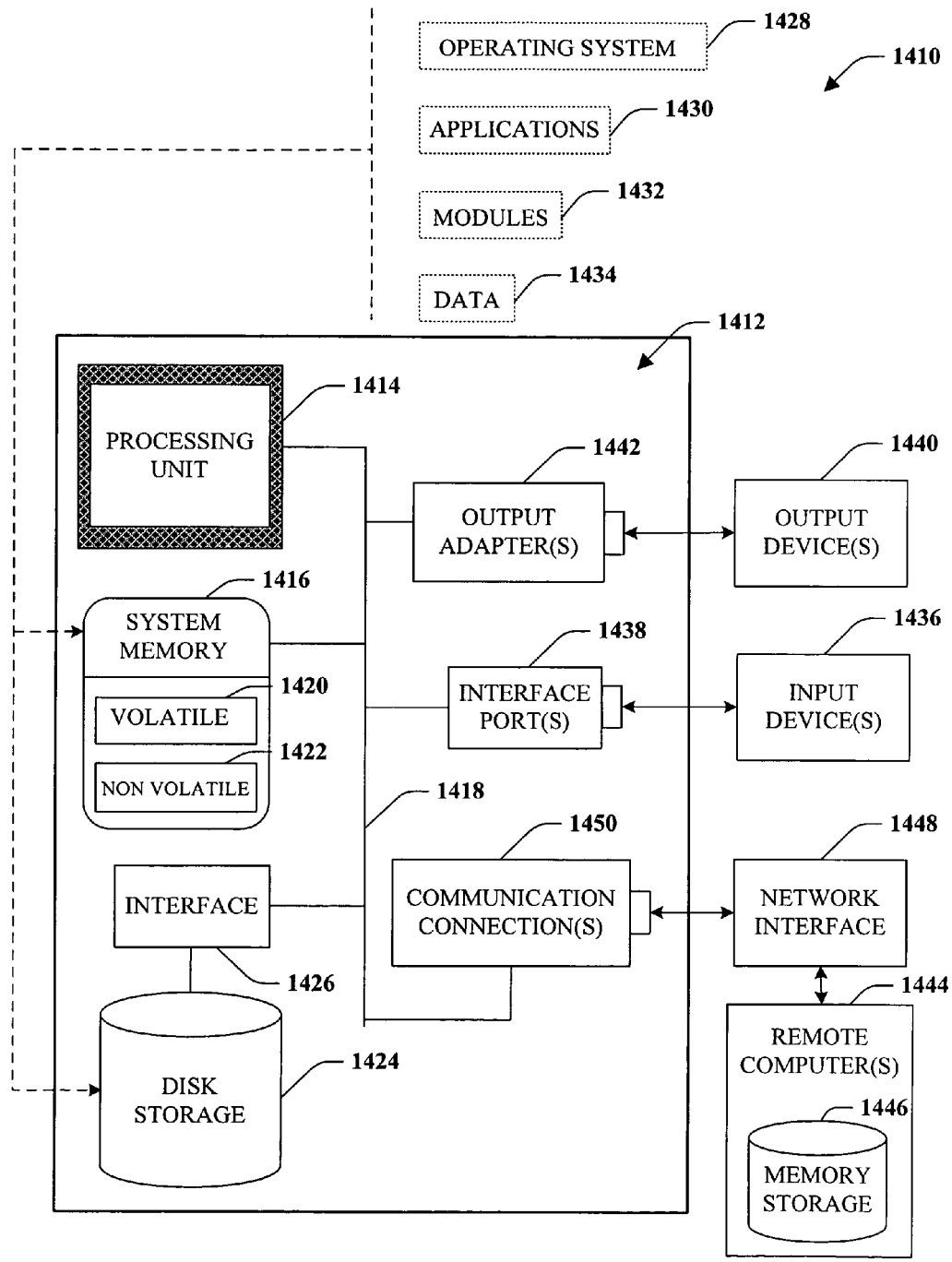
FIG. 14 is a schematic block diagram illustrating a suitable operating environment.
Figure 15:
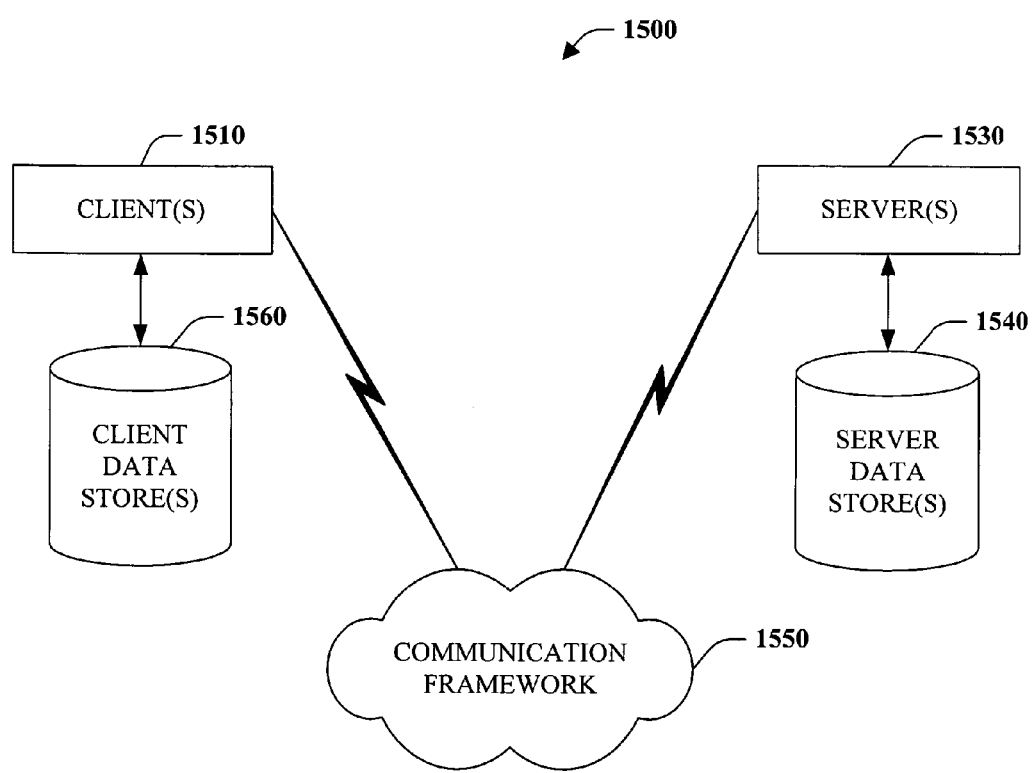
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary environment 1410 for implementing various aspects disclosed herein includes a computer 1412 (e.g., desktop, laptop, server, hand held, programmable consumer or industrial electronics . . . ). The computer 1412 includes a processing unit 1414, a system memory 1416, and a system bus 1418. The system bus 1418 couples system components including, but not limited to, the system memory 1416 to the processing unit 1414. The processing unit 1414 can be any of various available microprocessors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable ROM (EEPROM), or flash memory. Volatile memory 1420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1412 also includes removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in suitable operating environment 1410. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the present invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412 and to output information from computer 1412 to an output device 1440. Output adapter 1442 is provided to illustrate that there are some output devices 1440 like displays (e.g., flat panel and CRT), speakers, and printers, among other output devices 1440 that require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems, power modems and DSL modems, ISDN adapters, and Ethernet cards or components.

FIG. 15 is a schematic block diagram of a sample-computing environment 1500 with which the present invention can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the present invention, for example. One possible communication between a client 1510 and a server 1530 may be in the form of a data packet adapted to be transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1560 that can be employed to store information local to the client(s) 1510. Similarly, the server(s) 1530 are operatively connected to one or more server data store(s) 1540 that can be employed to store information local to the servers 1530.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" "having" or forms thereof are used in either the detailed description or the claims, such terms are intended to be inclusive in a manner similar to the term "comprising" as "comprising" is interpreted when employed as a transitional word in a claim.

What is claimed is:

1. A computer-implemented method for performing static type checking of dynamic languages in an Integrated Development Environment (IDE) that is running on a computer, the method comprising:
   receiving input to the IDE that specifies a supplemental type system to be added to the IDE, the IDE having a base type system corresponding to an object-oriented programming language, the supplemental type system comprising one of an XML data model or a relational data model;
   attaching elements of the supplemental type system to objects of the base type system such that the objects are associated with a base type and a supplemental type; and
   in response to receiving user input into a text editor of the IDE, the user input being associated with an object of the base type system, providing visual feedback that is based on the base type of the object as well as the supplemental type associated with the object.

2. The method of claim 1, wherein the supplemental type system is added to the IDE by performing one of the following:
   utilizing a reference mechanism provided by an IDE project;
   adding metadata to individual code files of an IDE project; or
   adding the supplement type system directly to code in a global declaration section of an IDE project.

3. The method of claim 2, wherein the reference mechanism adds references to metadata of the supplemental type system, the metadata comprising one or more relational or XML schemas.

4. The method of claim 1, wherein the elements of the supplemental type system are attached to objects of the base type system using one of the following:
   one or more namespaces;
   a compile-time meta-object protocol;
   one or more phantom types;
   one or more custom attributes;
   type inference; or
   one or more contracts.

5. The method of claim 1, wherein the visual feedback comprises a list of sub-elements that are available to the object, the list including sub-elements from the supplemental type system.

6. The method of claim 5, wherein the user input into the text editor comprises the object followed by a ".".

7. The method of claim 5, wherein the visual feedback comprises an indication that a sub-element in the list is constrained to a particular data type by the base type system and is constrained to a particular format by the supplemental type system.

8. The method of claim 7, wherein the particular data type is string.

9. The method of claim 1, wherein the user input into the text editor comprises the object followed by a "." and a sub-element of either the base type system or the supplemental type system, and wherein the visual feedback comprises an indication that the sub-element is not a proper sub-element of the object.

10. The method of claim 9, wherein if the sub-element is a sub-element of the base type system, the visual feedback is displayed with a first color, whereas if the sub-element is a sub-element of the supplemental type system, the visual feedback is displayed with a second color.

11. A computer storage medium having stored thereon computer executable instructions which when executed by a processor in a computer system implement steps for performing static type checking of dynamic languages in an Integrated Development Environment (IDE), the steps comprising:
   receiving input to the IDE that specifies a supplemental type system to be added to the IDE, the IDE having a base type system corresponding to an object-oriented programming language, the supplemental type system comprising one of an XML data model or a relational data model;
   attaching elements of the supplemental type system to objects of the base type system such that the objects are associated with a base type and a supplemental type; and
   in response to receiving user input into a text editor of the IDE, the user input being associated with an object of the base type system, providing visual feedback that is based on the base type of the object as well as the supplemental type associated with the object.

12. The computer storage medium of claim 11, wherein the supplemental type system is added to the IDE by performing one of the following:
   utilizing a reference mechanism provided by an IDE project;
   adding metadata to individual code files of an IDE project; or
   adding the supplement type system directly to code in a global declaration section of an IDE project.

13. The computer storage medium of claim 12, wherein the reference mechanism adds references to metadata of the supplemental type system, the metadata comprising one or more relational or XML schemas.

14. The computer storage medium of claim 11, wherein the elements of the supplemental type system are attached to objects of the base type system using one of the following:
   one or more namespaces;
   a compile-time meta-object protocol;
   one or more phantom types;
   one or more custom attributes;
   type inference; or
   one or more contracts.

15. The computer storage medium of claim 11, wherein the visual feedback comprises a list of sub-elements that are available to the object, the list including sub-elements from the supplemental type system.

16. The computer storage medium of claim 15, wherein the user input into the text editor comprises the object followed by a ".".

17. The computer storage medium of claim 15, wherein the visual feedback comprises an indication that a sub-element in the list is constrained to a particular data type by the base type system and is constrained to a particular format by the supplemental type system.

18. The computer storage medium of claim 17, wherein the particular data type is string.

19. The computer storage medium of claim 11, wherein the user input into the text editor comprises the object followed by a "." and a sub-element of either the base type system or the supplemental type system, and wherein the visual feedback comprises an indication that the sub-element is not a proper sub-element of the object.

20. The computer storage medium of claim 19, wherein if the sub-element is a sub-element of the base type system, the visual feedback is displayed with a first color, whereas if the sub-element is a sub-element of the supplemental type system, the visual feedback is displayed with a second color.

* * * * *